United States Patent [19]
Hiraguchi et al.

[11] Patent Number: 5,327,715
[45] Date of Patent: Jul. 12, 1994

[54] ALUMINUM ALLOY CHAIN AND METHOD OF MAKING SAME

[75] Inventors: Yoshitsugu Hiraguchi; Kazuyoshi Kaneko, both of Iwata, Japan

[73] Assignee: Yamaha Hatsudoki Kabushiki Kaisha, Japan

[21] Appl. No.: 825,073

[22] Filed: Jan. 24, 1992

[30] Foreign Application Priority Data

Jan. 25, 1991 [JP] Japan .................... 3-023773

[51] Int. Cl.$^5$ ............................................. B21L 3/00
[52] U.S. Cl. ............................................. 59/31; 59/22; 59/35.1
[58] Field of Search .................. 59/22, 29, 31, 78, 35.1

[56] References Cited

U.S. PATENT DOCUMENTS

| | | | |
|---|---|---|---|
| 1,983,683 | 12/1934 | Stahl | 59/31 |
| 2,125,967 | 8/1938 | Taylor et al. | 59/29 |

FOREIGN PATENT DOCUMENTS

| | | | |
|---|---|---|---|
| 0047237 | 4/1981 | Japan | 59/29 |
| 59-19049 | 1/1984 | Japan . | |
| 0126637 | 5/1988 | Japan | 59/31 |
| 2-56533 | 11/1990 | Japan . | |

*Primary Examiner*—David Jones
*Attorney, Agent, or Firm*—Bacon & Thomas

[57] ABSTRACT

An aluminum alloy chain is formed from welded loops of aluminum rod that constitute the individual links of the chain. During welding, a weld bead is produced by fusing opposed ends of bent aluminum alloy rod stock and pressing the ends together while fused to create a weld bead that extends beyond the perimeter of the rod stock, at least in a direction towards the inside of the link. The aluminum alloy chain can be anodized entirely or at selected intervals to provide a colorful chain or to provide a measurement of the length of the chain. The chain is particularly adapted for use with anchors used in connection with nautical vessels.

1 Claim, 2 Drawing Sheets

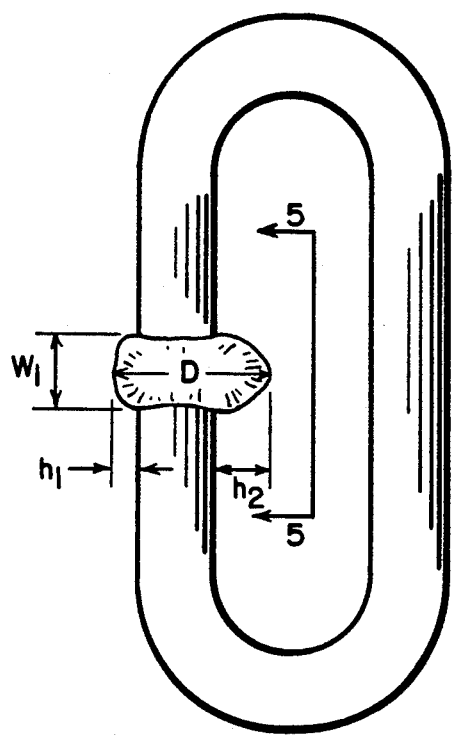
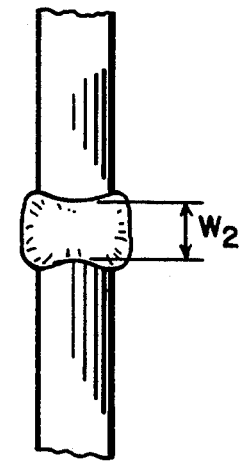
Fig. 4
Fig. 5
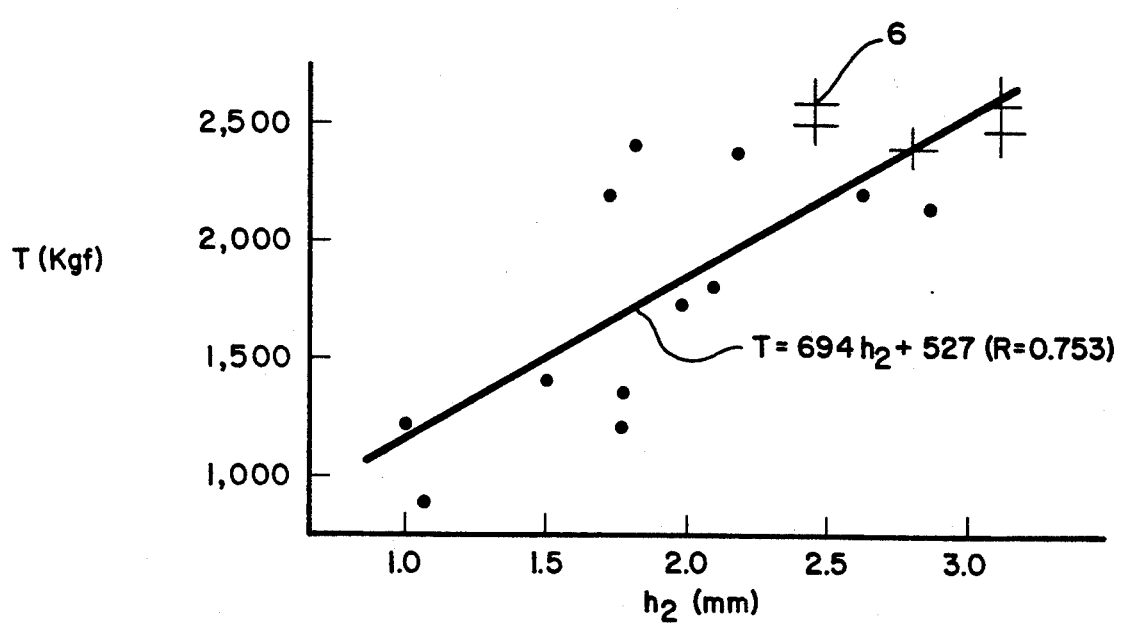
Fig. 6

ALUMINUM ALLOY CHAIN AND METHOD OF MAKING SAME

FIELD OF THE INVENTION

This invention relates to aluminum alloy chain comprising a plurality of joined loops of aluminum alloy rod stock, and in particular the manner in which the chain is constructed by welding the ends of loops of aluminum alloy rod stock to form closed links.

BACKGROUND OF THE INVENTION

This invention is concerned primarily with aluminum alloy chains used for hoisting anchors used on ships. In the prior art, it is known to use nylon ropes or iron chains for this purpose. However, nylon ropes, while lightweight, do not function well with automatic reeling systems due to slippage, etc. Iron chains, while enabling the use of a sprocket reel for automatic hoisting of the anchor, are quite heavy, particularly when long chains are used. Aluminum chains generally are considered to lack sufficient strength for use as anchor chains. Accordingly, there exists a need for a strong aluminum alloy chain that would be lightweight and enable the use of a sprocket automatic reeling device for hoisting an anchor.

However, it is a well-known theorem that a chain is only as strong as its weakest link. With aluminum chains, the problem encountered in manufacturing a uniformly strong chain is creating uniformly strong welds in every single link of the chain, which is normally manufactured by forming a loop of aluminum alloy rod stock with the ends of the loop unconnected, and then fusion welding the ends of the loop together using any appropriate fusion welding process. Due to the large number of links that normally constitute a chain, it is quite difficult normally in a manufacturing process to obtain an optimum weld for each weld in the links. Essentially, it was previously virtually impossible to detect by visual inspection whether or not sufficient weld penetration of the base metal occurred during any weld so as to ensure optimum strength for the particular weld being inspected. That is, a poor weld would appear visually just as acceptable as a very strong weld.

It is therefore highly desirable to provide a system for welding aluminum alloy chain links in a manner that will permit simple visual inspection to determine if adequate weld penetration of the base metal has occurred to thereby produce a weld that is at least as strong from a tensile strength standpoint as the base metal.

BRIEF SUMMARY OF THE INVENTION

In accordance with the present invention, the links of an aluminum alloy chain are formed by welding opposing abutting ends of aluminum alloy rod stock that had been formed into loops by fusion welding the abutting ends together and, during the welding process, squeezing and displacing a portion of the fused metal out from between the abutting ends by moving the abutting ends of the unfused base metal together to create a weld bead that can be visually inspected upon completion of the weld. By correlating the size and shape of the weld bead with the tensile strength of the welded link, criteria can be obtained that will permit ready visual inspection of the welded link from which it can be determined if an optimum weld has been produced for the link being inspected.

It has been determined that the displacement of the fused metal towards the inside of the loop is essential to form an optimum welded joint for aluminum alloy link chains and that visual inspection of the welded link is facilitated in accordance with the dimensional and geometric configuration of the weld bead. That is, the displacement of the weld bead towards the inner portion of the link indicates that good penetration of the base metal has occurred during the welding procedure and that maximum tensile strength obtainable has been achieved, provided that the parameters of the weld bead appear to the observer to conform with a predetermined geometry.

Another aspect of the invention is color coding by anodization of the aluminum alloy chain links to provide an indicator of length of chain. In accordance with this feature of the invention, selected links are color anodized at predetermined periodic intervals of equal length to provide a visual marker on the chain indicative of the length of the chain dispensed.

BRIEF DESCRIPTION OF THE DRAWINGS

With reference to the drawings appended hereto:

FIG. 4 is an enlarged view of a welded aluminum alloy link illustrating various parameters of the weld bead;

FIG. 5 is a view taken along arrows V—V of FIG. 4;

FIG. 6 is a graphical depiction of the relationship between the parameter $h_2$ illustrated in FIG. 4 and tensile strength of a welded link.

DETAILED DESCRIPTION OF THE INVENTION

Figure 1:
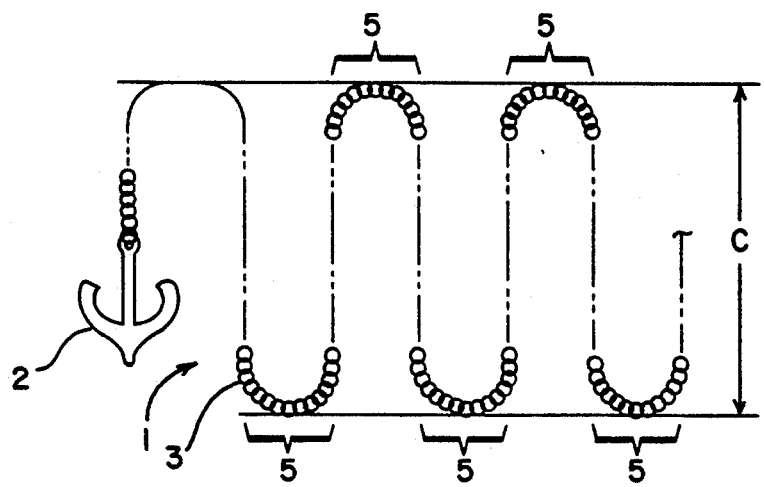
FIG. 1 is a schematic side view of an aluminum alloy chain constructed in accordance with the invention showing color anodized links at spaced predetermined intervals.

With reference to FIG. 1, there is illustrated an aluminum alloy link chain made up of fusion welded links 3 of aluminum alloy rod stock. At intervals 5 along the chain, a few links are color anodized to provide a visual indication of length of chain. Such color anodization could be carried out by any well-known process.

Figure 2:
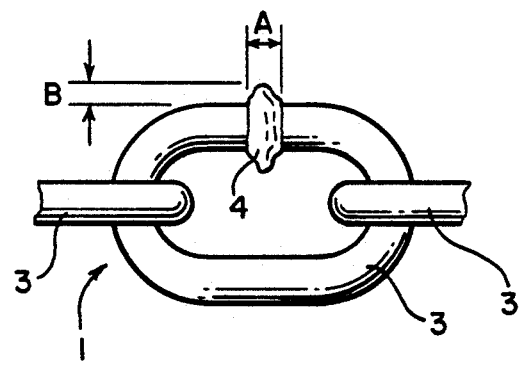
FIG. 2 is a side elevation view of a welded aluminum alloy link in accordance with one embodiment of the invention.

As shown in FIG. 2, each link of the chain is formed by bending aluminum alloy rod stock in a generally "C" configuration to form a loop with abutting unconnected ends that are subsequently fusion welded to create a weld bead 4 having a height B and a width A.

Figure 3:
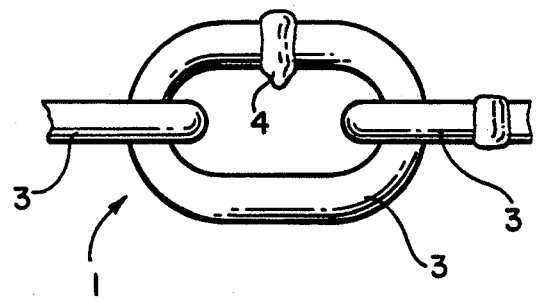
FIG. 3 is a side elevation view of a welded aluminum alloy link in accordance with another embodiment of the invention.

As illustrated in FIG. 3, which actually constitutes a preferred embodiment of the invention, the weld bead 4 has its greatest height located towards the inside of the chain link or loop. The weld bead 4 is obtained by fusion welding the base metal and squeezing the ends of the rod stock together to squeeze out and display a portion of the fused metal circumferentially and radially relative to the rod stock. In accordance with FIG. 3, in the preferred embodiment the link and fused metal are manipulated in such a manner that the cooled weld bead has a greater height towards the inside of the loop for reasons that will be discussed below.

The problem to be overcome in producing an aluminum alloy link chain using welded links is to ensure that each weld achieves optimum strength for each link to provide maximum chain strength. Ideally, each weld should be as strong as the base metal constituting the aluminum alloy rods, but various influences occur that can prevent achieving a sound weld at each and every link joint. Fusion welding aluminum alloy is notoriously well known to require very careful modulation of welding heat and proper technique to ensure that an adequate amount of base metal has been fused to produce a strong joint that is equal to the strength of the unfused base metal. Unless an optimum weld is produced, tensile strength of the chain is reduced in accordance with the strength of the weakest weld in the entire chain. Thus, inspection of each weld is required if a strong chain having maximum tensile strength is to be obtained.

However, visual inspection of welds in chain loops requires a visual appearance indicative of an optimum weld if the visual inspection technique is to be successful. In particular, it is highly desirable to provide a visual cue based upon the geometry of the weld bead indicative of whether an optimum weld has been achieved without the need for other forms of non-destructive testing or measurements.

One can arrive at desirable weld bead parameters by producing a variety of weld beads on aluminum alloy links and then subjecting the welded links to tensile tests that correlate the various weld bead parameters with tensile strength of the welded link. Thus, with reference to FIGS. 4 and 5, weld parameters can be identified as follows:

D—Total bead thickness measured radially relative to the longitudinal center line of the link.
$w_1$—Bead length
$w_2$—Minimum bead length on the inside of the link
$h_1$—Bead height on the outside of the link
$h_2$—Bead height on the inside of the link It has been determined that links undergoing tensile tests tend to fail near the inside zone of the weld bead if the weld bead is not optimum (i.e., is weaker than the base metal). Accordingly, it has been observed that $h_2$ is an important dimension to be observed when visually inspecting welded aluminum alloy chain links. Accordingly, in accordance with one example, rod stock of A 5056 aluminum alloy having a diameter of 8 mm was welded in accordance with the procedures outlined previously, namely, the abutting ends of the rod stock are fusion welded and then the ends are brought together to create a bead that protrudes beyond the circumference of the rod stock in such a manner that $h_2$ is greater than $h_1$. Weld beads having heights $h_2$ from 1 mm-3 mm were tested to determine the tensile strength of each link and a correlation was observed between maximum tensile strength and the height $h_2$. The relationship is depicted graphically in FIG. 6. Notably, the cluster of points 6 depicted by crossed lines were obtained with fracture of the base metal, not the weld.

Tensile strength T was then empirically related to $h_2$ in accordance with the mathematical formula:

$$T = 694 h_2 + 527 \qquad (1)$$

A correlation coefficient R was then deduced using statistical analysis relating maximum tensile strength with height $h_2$. In this particular case, $R = 0.753$.

Similar tests relating $W_1$, D, $h_1$ and $W_2$ to maximum tensile strength reveal that correlation coefficients could be obtained between each dimension of the welding bead and tensile strength. For a single example of an 8 mm A 5056 aluminum alloy welded link, correlation coefficients as follows were obtained.

$w_1$—0.176
D—0.247
$h_1$— —0.245
$h_2$—0.753
$w_2$ 0.727

Using the correlation coefficients for maximum tensile strength, welding of the aluminum alloy is carried out in the manner described above so that the weld bead exhibits appropriate dimensional relationships showing that a weld has been produced that ensures maximum tensile strength for the welded link that is possible to achieve. In particular, it has been observed that the dimension $h_2$ is particularly important to ensure that penetration of the base metal in the inner zone of the rod near the inner side of the link has been achieved, since this is the region where tensile failure generally occurs in a welded link aluminum alloy chain.

Preferably, aluminum alloy used for anchor chains constitutes 5000 and 6000 Series alloys for weldability and resistance to corrosion and sea water. The lighter weight aluminum alloy, as compared with an iron or stainless steel chain, reduces power consumption consumed by a windlass and facilitates handling of the chain. For example, when a 16 kg. anchor is used in water 20 m deep, 10 meters of the chain weighs only 19 kg. (the immersed weight) which represents a 62% power savings when hoisting the anchor.

Non-heat treated aluminum alloy in the 5000 Series has been successfully used for the chain links, but it is also contemplated that a 6000 Series heat treated aluminum alloy also could be used.

The entire chain could be color anodized to coordinate with the color of the vessel from which the chain is dropped or color anodization could be utilized to produce an indication of length of the chain, for example by color anodizing a portion of the chain every 10 meters or so. The anodization also provides an anti-corrosive protection for the aluminum alloy, while providing a hard surface resistant to wear on the surface of the chain links.

Thus, a welding process for aluminum alloy chain links has been described that produces a weld bead lending itself to visual inspection to determine if an optimum weld has been achieved for each link. By empirical testing, a correlation has been observed between tensile strength and various weld bead parameters, in particular the inside height of the weld bead, which enables visual observation and comparison with a standard, for example, to be utilized to determine if penetration of the base metal has occurred to a sufficient extent to ensure achievement of maximum tensile strength for the welded link.

Any suitable welding process could be utilized provided that some form of control is available to ensure that fused metal is displaced out of the weld area, particularly toward the inside of the link. It will be understood that various modifications and embodiments of the invention are possible in accordance with known techniques in the field of welded chain link production. Preferred embodiments of the invention are herein described by way of example only and it is to be understood that the invention is only to be limited by the scope and content of the appended claims.

We claim:

1. A method of making an aluminum alloy chain from welded loops of aluminum rod comprising the steps of:
   forming linked loops of aluminum alloy rod stock with abutting unconnected ends;
   fusion welding the abutting ends of the loops and squeezing and displacing a portion of the fused metal out from between the abutting ends by moving the abutting ends of unfused metal together;
   cooling the welded joint with the cooled displaced fused metal attached to the welded joint as a circumferential bead; and
   color anodizing selected welded links at predetermined intervals along the chain, wherein said predetermined intervals correspond to selected periodic increments of equal length.

* * * * *